(12) United States Patent
Xiao et al.

(10) Patent No.: US 12,145,598 B2
(45) Date of Patent: Nov. 19, 2024

(54) METHOD AND DEVICE FOR DRIVER ASSISTANCE FOR DETERMINING HABITS OF DRIVER

(71) Applicant: NIO TECHNOLOGY (ANHUI) CO., LTD, Hefei (CN)

(72) Inventors: Bohong Xiao, Hefei (CN); Xianhui Zhang, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 303 days.

(21) Appl. No.: 17/532,339

(22) Filed: Nov. 22, 2021

(65) Prior Publication Data
US 2022/0176973 A1 Jun. 9, 2022

(30) Foreign Application Priority Data

Dec. 7, 2020 (CN) .......................... 202011416828.7

(51) Int. Cl.
*B60W 40/09* (2012.01)
*B60W 50/10* (2012.01)
*G07C 5/02* (2006.01)

(52) U.S. Cl.
CPC ............ *B60W 40/09* (2013.01); *B60W 50/10* (2013.01); *G07C 5/02* (2013.01);
(Continued)

(58) Field of Classification Search
CPC .. B60W 40/09; B60W 50/10; B60W 2420/42; B60W 2520/10; B60W 2520/12;
(Continued)

(56) References Cited

U.S. PATENT DOCUMENTS

2010/0045452 A1* 2/2010 Periwal .................... B60Q 9/00
340/439
2015/0224990 A1* 8/2015 Kim .................. B60W 50/0097
701/93
(Continued)

FOREIGN PATENT DOCUMENTS

DE 102007041020 3/2009
DE 102018204288 9/2019
(Continued)

OTHER PUBLICATIONS

Extended Search Report for European Patent Application No. 21211136.3, dated May 16, 2022, 8 pages.

*Primary Examiner* — Behrang Badii
(74) *Attorney, Agent, or Firm* — Sheridan Ross P.C.

(57) ABSTRACT

The invention relates to a method and device for driver assistance for determining habits of a driver, a computer storage medium, and a vehicle. The method for driver assistance for determining the habits of the driver includes: recognizing a vehicle working condition; recognizing a vehicle status; and determining the habits of the driver based on the vehicle working condition and the vehicle status, where the recognizing a vehicle working condition includes: performing first vehicle working condition recognition based on vehicle speed information; and performing second vehicle working condition recognition based on a combination of map information and positioning information and/or camera information. By performing working condition recognition twice, accuracy of vehicle working condition recognition can be improved and a vehicle working condition recognition result can be prevented from incorrectly and frequently switching between various vehicle working conditions. This achieves efficient and accurate vehicle working condition recognition.

8 Claims, 2 Drawing Sheets

(52) U.S. Cl.
CPC ... *B60W 2420/403* (2013.01); *B60W 2520/10* (2013.01); *B60W 2520/12* (2013.01); *B60W 2540/043* (2020.02); *B60W 2540/30* (2013.01); *B60W 2556/50* (2020.02)

(58) Field of Classification Search
CPC ....... B60W 2540/043; B60W 2540/30; B60W 2556/50; B60W 30/16; B60W 2520/04; B60W 2540/10; B60W 2540/12; B60W 2552/05; B60W 2554/802; B60W 2556/10; B60W 2556/35; B60W 2720/106; B60W 2754/30; B60W 40/08; B60W 2420/52; B60W 2420/403; B60W 2420/408; G07C 5/02
See application file for complete search history.

(56) References Cited

U.S. PATENT DOCUMENTS

2017/0309092 A1* 10/2017 Rosenbaum ......... G07C 5/0808
2021/0188311 A1*  6/2021 Cho ...................... B60W 50/14

FOREIGN PATENT DOCUMENTS

WO    WO 2017/202901    11/2017
WO    WO 2020/004319     1/2020

\* cited by examiner

METHOD AND DEVICE FOR DRIVER ASSISTANCE FOR DETERMINING HABITS OF DRIVER

CROSS-REFERENCE TO RELATED APPLICATION

This application claims the benefit of China Patent Application No. 202011416828.7 filed Dec. 7, 2020, the entire contents of which are incorporated herein by reference in its entirety.

TECHNICAL FIELD

The invention relates to the technical field of intelligent driving. Specifically, the invention relates to a method and device for driver assistance for determining habits of a driver, a computer storage medium, and a vehicle.

BACKGROUND ART

In vehicle control for driver assistance, taking adaptive cruise control (ACC) as an example, a driver needs to set a time interval, to calculate a safe vehicle-following distance and a vehicle-following speed curve. In commonly used algorithms, the driver needs to set a time interval, and a controller calculates a distance required between a vehicle and another vehicle ahead based on the time interval and a current vehicle speed, and calculates occasions for deceleration in stopping the vehicle and starting the vehicle. The method cannot adapt to actual daily driving habits of the driver, causing a need of frequent intervention of the driver in processes of starting, vehicle following, and stopping. This affects driving experience of the driver in a driver assistance process.

SUMMARY OF THE INVENTION

According to an aspect of the invention, a method for driver assistance for determining habits of a driver is provided, the method including: recognizing a vehicle working condition; recognizing a vehicle status; and determining the habits of the driver based on the vehicle working condition and the vehicle status, where the recognizing a vehicle working condition includes: performing first vehicle working condition recognition based on vehicle speed information; and performing second vehicle working condition recognition based on a combination of map information and positioning information and/or camera information.

As an alternative or a supplement of the foregoing solution, the method for driver assistance for determining the habits of the driver according to an embodiment of the invention further includes: correcting a result of the first vehicle working condition recognition based on a result of the second vehicle working condition recognition.

As an alternative or a supplement of the foregoing solution, in the method for driver assistance for determining the habits of the driver according to an embodiment of the invention, the recognizing a vehicle status includes: recognizing the vehicle status based on one or more of the vehicle speed information, vehicle feedback information, radar information, and camera information.

As an alternative or a supplement of the foregoing solution, in the method for driver assistance for determining the habits of the driver according to an embodiment of the invention, the vehicle status is starting, vehicle following, or stopping.

As an alternative or a supplement of the foregoing solution, in the method for driver assistance for determining the habits of the driver according to an embodiment of the invention, the determining the habits of the driver based on the vehicle working condition and the vehicle status includes: obtaining a parameter indicating the habits of the driver by means of a moving average method.

As an alternative or a supplement of the foregoing solution, in the method for driver assistance for determining the habits of the driver according to an embodiment of the invention, the determining the habits of the driver based on the vehicle working condition and the vehicle status further includes: associating the parameter indicating the habits of the driver with one or more of the vehicle working condition and the vehicle status.

As an alternative or a supplement of the foregoing solution, the method for driver assistance for determining the habits of the driver according to an embodiment of the invention further includes: depending on one or more of a current vehicle working condition and a current vehicle status, controlling a vehicle based on the associated parameter.

As an alternative or a supplement of the foregoing solution, the method for driver assistance for determining the habits of the driver according to an embodiment of the invention further includes: obtaining driver identity information indicating an identity of the driver.

As an alternative or a supplement of the foregoing solution, in the method for driver assistance for determining the habits of the driver according to an embodiment of the invention, the determining the habits of the driver based on the vehicle working condition and the vehicle status includes: associating a parameter indicating the habits of the driver with one or more of the vehicle working condition and the vehicle status and the identity of the driver.

As an alternative or a supplement of the foregoing solution, the method for driver assistance for determining the habits of the driver according to an embodiment of the invention further includes: depending on one or more of a current vehicle working condition and a current vehicle status and current driver identity information, controlling a vehicle based on the associated parameter.

According to another aspect of the invention, a device for driver assistance for determining habits of a driver is provided, the device including: a vehicle working condition recognition apparatus; a vehicle status recognition apparatus; and a habit determination apparatus configured to determine the habits of the driver based on the vehicle working condition and the vehicle status, where the vehicle working condition recognition apparatus is configured to: perform first vehicle working condition recognition based on vehicle speed information; and perform second vehicle working condition recognition based on a combination of map information and positioning information and/or camera information.

As an alternative or a supplement of the foregoing solution, in the device for driver assistance for determining the habits of the driver according to an embodiment of the invention, the vehicle working condition recognition apparatus is further configured to: correct a result of the first vehicle working condition recognition based on a result of the second vehicle working condition recognition.

As an alternative or a supplement of the foregoing solution, in the device for driver assistance for determining the habits of the driver according to an embodiment of the invention, the vehicle status recognition apparatus is configured to: recognize the vehicle status based on one or more of the vehicle speed information, vehicle feedback information, radar information, and camera information.

As an alternative or a supplement of the foregoing solution, in the device for driver assistance for determining the habits of the driver according to an embodiment of the invention, the vehicle status is starting, vehicle following, or stopping.

As an alternative or a supplement of the foregoing solution, in the device for driver assistance for determining the habits of the driver according to an embodiment of the invention, the habit determination apparatus is further configured to: obtain a parameter indicating the habits of the driver by means of a moving average method.

As an alternative or a supplement of the foregoing solution, in the device for driver assistance for determining the habits of the driver according to an embodiment of the invention, the habit determination apparatus is further configured to: associate the parameter indicating the habits of the driver with one or more of the vehicle working condition and the vehicle status.

As an alternative or a supplement of the foregoing solution, the device for driver assistance for determining the habits of the driver according to an embodiment of the invention further includes: a vehicle control apparatus configured to: depending on one or more of a current vehicle working condition and a current vehicle status, control a vehicle based on the associated parameter.

As an alternative or a supplement of the foregoing solution, the device for driver assistance for determining the habits of the driver according to an embodiment of the invention further includes: a driver identity information obtaining apparatus configured to: obtain driver identity information indicating an identity of the driver.

As an alternative or a supplement of the foregoing solution, in the device for driver assistance for determining the habits of the driver according to an embodiment of the invention, the habit determination apparatus is further configured to: associate a parameter indicating the habits of the driver with one or more of the vehicle working condition and the vehicle status and the identity of the driver.

As an alternative or a supplement of the foregoing solution, the device for driver assistance for determining the habits of the driver according to an embodiment of the invention further includes: a vehicle control apparatus configured to: depending on one or more of a current vehicle working condition and a current vehicle status and current driver identity information, control a vehicle based on the associated parameter.

According to still another aspect of the invention, a computer-readable storage medium is provided, storing program instructions executable by a processor, and when the program instructions are executed by the processor, the method according to any embodiment of an aspect of the invention is performed.

According to yet still another aspect of the invention, a vehicle is provided, including the device according to any embodiment of an aspect of the invention.

According to the solutions in one or more embodiments of the invention, the method applicable to determining daily driving habits of a driver can be provided. Therefore, in a driver assistance process under different working conditions, control of a driver assistance system on starting, vehicle following, and stopping more adapts to expectations of the driver, thereby improving driving experience of the driver in the driver assistance process.

BRIEF DESCRIPTION OF THE DRAWINGS

The above-mentioned and/or other aspects and advantages of the invention will become clearer and more comprehensible from the following description of various aspects with reference to the accompanying drawings, and the same or similar units in the accompanying drawings are denoted by the same reference numerals. The accompanying drawings include.

DETAILED DESCRIPTION OF EMBODIMENTS

In this specification, the invention is described more comprehensively with reference to the accompanying drawings showing schematic embodiments of the invention. However, the invention may be implemented in different forms but should not be construed as being limited to the embodiments herein. The embodiments provided herein are intended to make the disclosure of this specification comprehensive and complete, to more comprehensively convey the scope of protection of the invention to those skilled in the art.

The terms such as "include" and "comprise" indicate that in addition to the units and steps that are directly and clearly described in the specification and the claims, other units and steps that are not directly or clearly described are not excluded in the technical solutions of the invention. The terms such as "first" and "second" are not used to indicate sequences of units in terms of time, space, size, and the like, and are only used to distinguish various units.

The invention is described below with reference to flowchart descriptions, block diagram and/or flowchart of the method and system according to the embodiments of the invention. It should be understood that each block of these flowchart descriptions and/or the block diagram, and combinations of the flowchart descriptions and/or the block diagram, can be implemented by computer program instructions. These computer program instructions may be provided for a processor of a general-purpose computer, a dedicated computer, or another programmable data processing device to generate a machine, so that the instructions executed by the processor of the computer or the another programmable data processing device create components for implementing the functions/operations specified in these flowcharts and/or blocks and/or one or more flow block diagrams. It should also be noted that in some alternative implementations, the functions/operations shown in the blocks may not occur in the order shown in the flowchart. For example, two blocks shown in sequence may actually be executed substantially simultaneously or the blocks may sometimes be executed in a reverse order, depending on the functions/operations involved.

Various embodiments provided in the present disclosure may be implemented by hardware, software, or a combination of hardware and software where applicable. Further, without departing from the scope of the present disclosure, various hardware components and/or software components described in this specification may be combined into a combined component including software, hardware, and/or both where applicable. Without departing from the scope of the present disclosure, various hardware components and/or software components described in this specification may be separated into sub-components including software, hardware, or both where applicable. Further, it is assumed that software components may be implemented as hardware components where applicable, and vice versa.

Figure 1:
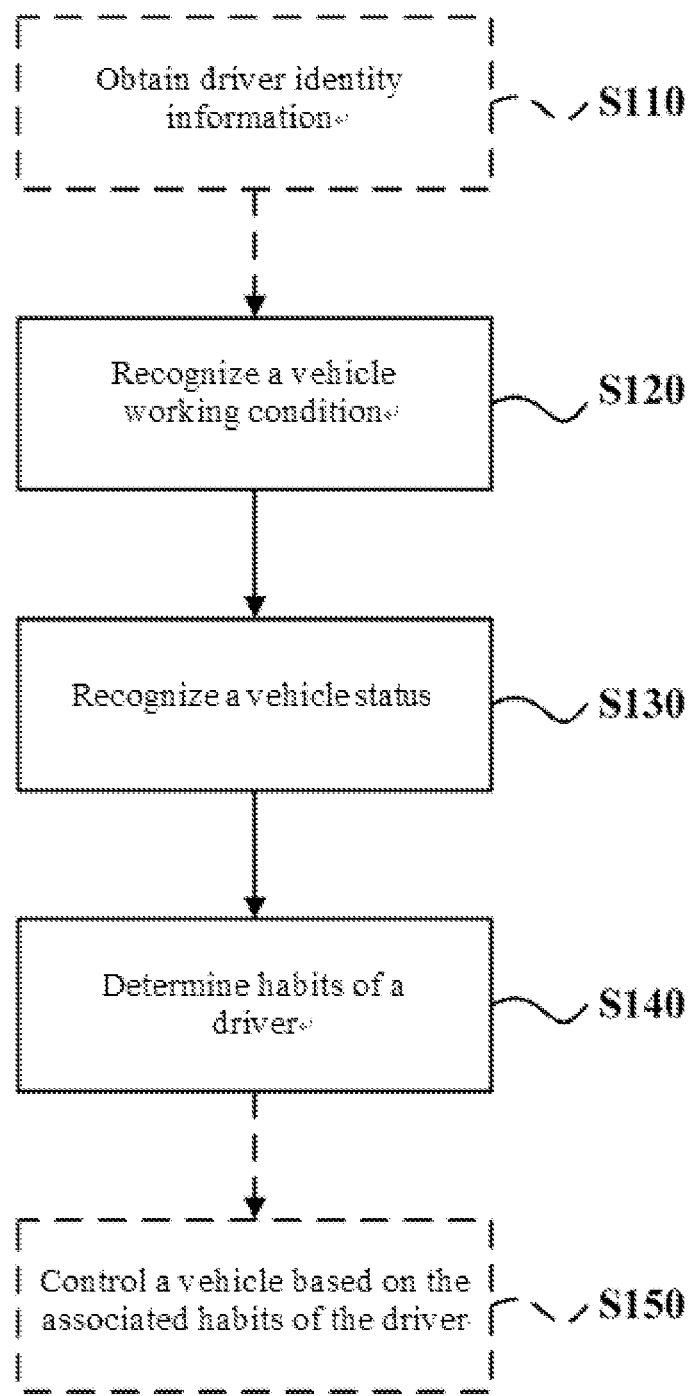
FIG. 1 is a schematic flowchart of a method 100 for driver assistance for determining habits of a driver according to an embodiment of the invention.

Refer now to FIG. 1. According to an aspect of the invention, FIG. 1 is a schematic flowchart of a method 100 for driver assistance for determining habits of a driver according to an embodiment of the invention. The method 100 for driver assistance for determining the habits of the driver may include the following steps: S120, recognizing a vehicle working condition; S130, recognizing a vehicle status; and S140, determining the habits of the driver based on the vehicle working condition and the vehicle status. Optionally, the method 100 may further include: S110, obtaining driver identity information indicating an identity of the driver; and step S150, controlling a vehicle based on an associated parameter indicating the habits of the driver. As described above, steps in the flowchart may not be performed in the order shown. For example, step S120 and step S130 may be performed sequentially or in parallel. The following describes in detail the steps in the method 100.

In step S120, the vehicle working condition is recognized. The vehicle working condition means a parameter about a type of a road on which the vehicle travels, and may include, for example, an urban working condition, a suburban working condition, and an expressway working condition. Usually, a traveling speed of the vehicle in the urban working condition is less than a traveling speed in the suburban working condition, and the traveling speed of the vehicle in the suburban working condition is less than a traveling speed in the expressway working condition. Therefore, first vehicle working condition recognition may be performed based on vehicle speed information. The vehicle speed information means information quantitatively indicating a vehicle traveling speed, and may include a speed of the vehicle, an acceleration of the vehicle, an instantaneous speed of the vehicle, an average speed of the vehicle within a time period, etc. Herein, a vehicle speed obtained by an onboard speed sensor within a time period is simply used as an example for description. For example, in a process of the first vehicle working condition recognition, an urban-suburban vehicle speed threshold and a suburban-expressway vehicle speed threshold may be set, and the vehicle working condition is further recognized based on a current vehicle speed and a result of comparing the current vehicle speed with the two thresholds. For example, the urban-suburban vehicle speed threshold may be 60 km/h, and the suburban-expressway vehicle speed threshold may be 80 km/h. In this case, when the vehicle speed is less than 60 km/h, the vehicle working condition is identified as the urban working condition; when the vehicle speed is from 60 km/h to 80 km/h, the vehicle working condition is identified as the suburban working condition; and when the vehicle speed is greater than 80 km/h, the vehicle working condition is identified as the expressway working condition.

However, in practice, speed ranges of the vehicle traveling in urban, suburban areas and on expressways are very likely to be partly overlapping, so that there are inevitably errors in vehicle working condition recognition simply by comparing the current vehicle speed with the urban-suburban vehicle speed threshold and the suburban-expressway vehicle speed threshold. For example, when the vehicle travels on a suburban road, if a pedestrian is approaching, a vehicle speed may be occasionally lowered to below 60 km/h. However, if the road is in a good condition, the vehicle speed may be occasionally increased to above 80 km/h. Therefore, when the recognition is only based on the comparison of the current vehicle speed with the two vehicle speed thresholds, a vehicle working condition recognition result may frequently switch between the three vehicle working conditions, but actually the vehicle has been in the suburban working condition the whole time. Consequently, erroneous determination of a vehicle working condition may be caused, and there is an increase of a load on an operating system due to frequent switching.

To alleviate the foregoing problem, second vehicle working condition recognition may be further performed based on a combination of map information and positioning information and/or camera information. The map information may mean map-based information including types of various roads (for example, the urban type, the suburban type, or the expressway type). The positioning information may mean map-based information indicating a position of the vehicle, for example, GPS information. Specifically, when the positioning information and the map information can be obtained, the above vehicle working condition result may be corrected based on the positioning information and the map information. For example, in pre-stored map information, various road types (for example, the urban type, the suburban type, or the expressway type) may be labeled in advance. In a process of recognizing the vehicle working condition, the vehicle working condition is recognized based on the pre-stored map information and current positioning information of the vehicle.

The vehicle working condition can be recognized by using the camera information together with the map information and the positioning information, or by using the camera information when the map information and the positioning information cannot be obtained. For example, especially when the map information and the positioning information cannot be obtained, the camera information is used to perform local analysis, which can improve accuracy of vehicle working condition recognition to some degree. In an embodiment, a scenario of the road ahead may be obtained by using an onboard camera, and the vehicle working condition is determined by comparing usual urban, suburban, and expressway scenarios by means of image recognition and other technologies. For example, an expressway exit sign, a speed limit sign, an expressway fence, a median strip, etc. may be used as features of the expressway working condition that can be recognized based on camera information; and buildings, traffic lights, pedestrians, etc. are used as features of the urban working condition that can be recognized based on camera information.

A result obtained in the second vehicle working condition recognition based on the positioning information, the map information, and/or the camera information may be used for further correcting a result obtained in the first vehicle working condition recognition based on the current vehicle speed and the preset thresholds, thereby improving accuracy of vehicle working condition recognition and preventing a vehicle working condition recognition result from incorrectly and frequently switching between various vehicle working conditions. This achieves efficient and accurate vehicle working condition recognition.

In step S130, the vehicle status is recognized. The vehicle status means a movement status of the vehicle, and may include starting, vehicle following, and stopping. Certainly, based on actual needs, other vehicle states may be recognized, or the foregoing vehicle states may be subdivided. For example, the state of stopping may be subdivided into stopping with the engine shut down and stopping with the engine started, and the like. The vehicle status may be recognized based on one or more of the vehicle speed information, vehicle feedback information (for example, a brake signal, an accelerator signal, etc.), radar information, and camera information. The following describes in detail embodiments of recognizing the states of starting, vehicle following, and stopping.

In a process of recognizing the state of starting, whether the vehicle is stationary is first determined. Whether the vehicle is stationary may be determined based on a standstill signal provided by a brake system of the vehicle and a vehicle speed signal (for example, a vehicle speed signal indicating that a vehicle speed is 0). When it is determined that the vehicle is stationary, if an accelerator signal indicating that an accelerator pedal is stepped on is received, a current vehicle status can be identified as starting. A starting vehicle speed threshold may be set, and when a vehicle speed is greater than the starting vehicle speed threshold, it is determined that the state of starting ends.

In a process of recognizing the state of vehicle following, the state of vehicle following may be determined based on a distance between this vehicle and a vehicle ahead and a relative speed that are calculated based on information from an onboard radar and camera, and whether the state of vehicle following ends is then determined based on a vehicle speed of this vehicle. The radar may emit an electromagnetic wave to project on the vehicle ahead and receive a reflected wave from the vehicle ahead, such that the distance between the vehicle ahead and this vehicle, a rate of distance change (that is, a speed), an orientation, and other information are obtained. The camera information can provide an image showing the scenario in front of this vehicle, to, for example, identify whether there is a vehicle ahead. For example, different vehicle-following distance thresholds and relative speed thresholds may be set for different vehicle working conditions. In an embodiment, an expressway vehicle-following distance threshold may be set to 50 m, a suburban vehicle-following distance threshold may be set to 30 m, and an urban vehicle-following distance threshold may be set to 20 m. Certainly, considering a relatively fast traveling speed in the expressway working condition, for the sake of safety, a vehicle-following distance is appropriately increased when a speed increases. Therefore, the expressway vehicle-following distance threshold may be further changed based on a current vehicle speed. Depending on a situation, vehicle-following distance thresholds in the various working conditions may be further changed based on the current vehicle speed. In another aspect, a value of a relative vehicle-following speed may be set, for example, to 0 km/h to 5 km/h. Therefore, in the case of the expressway working condition, if a distance between this vehicle and a vehicle ahead is within a range of the expressway vehicle-following distance threshold ±10 m, and a value of a relative speed of this vehicle and the vehicle ahead is 0 km/h to 5 km/h, it is determined that this vehicle is in the state of vehicle following.

In a process of recognizing the state of stopping, a brake signal and vehicle speed information of this vehicle may be used. It should be noted that, "the state of stopping" herein does not mean a stationary state in recognition of the state of starting but a state existing in a process of deceleration till standstill. In an embodiment, when the brake signal indicates that a brake pedal has been stepped on for a predetermined time or a time since being stepped on within a preset time period reaches a proportion, it may be determined that this vehicle enters the state of stopping. In another embodiment, a stopping vehicle speed threshold may be set, and with reference to the current vehicle speed information of this vehicle, when a vehicle speed is less than the stopping vehicle speed threshold, it is determined that this vehicle enters the state of stopping. Certainly, the stopping vehicle speed threshold may be set dynamically. For example, the stopping vehicle speed threshold may be set based on a current vehicle speed of this vehicle. In an embodiment, after the vehicle has run with a steady vehicle speed for a period of time, the steady vehicle speed may be used as a standard, and 50% of the steady vehicle speed is used as the stopping vehicle speed threshold. Certainly, the brake signal and the vehicle speed information may alternatively be used together. For example, when a vehicle speed is less than a threshold, the brake signal is used to determine whether the vehicle starts to enter the state of stopping. Then, after the vehicle enters the stationary state, the state of stopping the vehicle ends.

In addition, if there is no vehicle ahead this vehicle (that is, non-vehicle-following state) and it is not the state of starting or stopping, it is determined that the vehicle is in an "invalid state" at this time. When the vehicle is in the invalid state, control of the vehicle may not be changed.

In step S104, the habits of the driver are determined based on the vehicle working condition and the vehicle status. In this specification, the habits of the driver mean a vehicle speed, a vehicle acceleration, a vehicle-following distance from a vehicle ahead, etc. commonly used or preferred when the driver drives a vehicle in different scenarios (for example, vehicle working conditions and vehicle states). Different habits of the driver bring different driving or riding experience. For example, different accelerations may have different feelings of pushing back and stability. For another example, drivers having different requirements on safety prefer keeping different vehicle-following distances, and drivers having higher safety requirements usually prefer keeping a relatively long distance within a reasonable range from a vehicle ahead. In an embodiment, the determined habits of the driver include a vehicle acceleration and a distance between vehicles. Therefore, the determined habits of the driver can be more in accord with preferences of the driver in terms of riding experience, and also satisfy the driver's requirements on driving safety.

In a process of determining the habits of the driver, a moving average method, for example, may be used to obtain a parameter (for example, a vehicle acceleration and a distance between vehicles) indicating the habits of the driver, but any other applicable algorithms are not excluded. Herein, the moving average method is used as an example for description. The moving average, also referred to as a running average method, is a method of calculating, on the basis of a simple average method, a moving average value by sequentially dropping old data and adding new data with a succession, to eliminate irregular fluctuations and find out a developing trend according to which predication is carried out. A range of a plurality of consecutive simple average values for calculating a moving average value may be obtained by setting a time window (a length of which may be referred to as a moving period). In this embodiment, the simple average values may be obtained by using discrete data detected by a vehicle sensor in each interval.

For example, for a simple average value of the vehicle acceleration, it is assumed that an onboard accelerometer measures an acceleration 10 times per second, and then a simple average value of a vehicle acceleration within each second is an average value of 10 acceleration values within the second. For simple average values $a1=1$ m/s$^2$, $a2=2$ m/s$^2$, $a3=2$ m/s$^2$, $a4=2$ m/s$^2$ and $a5=5$ m/s$^2$ in 1 to 5 seconds (where t1 represents the first second, t2 represents the second second, t3 represents the third second, t4 represents the fourth second, and t5 represents the fifth second), if moving average values corresponding to t2, t3, and t4 are required (where the number of moving average values required to be calculated can alternatively be set based on needs), and a time window is set to 3 seconds, calculation is performed as follows:

$$\text{Moving average value } m2=(a1+a2+a3)/3=\tfrac{5}{3} \text{ m/s}^2;$$

$$\text{Moving average value } m3=(a2+a3+a4)/3=2 \text{ m/s}^2; \text{ and}$$

$$\text{Moving average value } m4=(a3+a4+a5)/3=3 \text{ m/s}^2.$$

The length of the time window (that is, a moving period) may be set based on needs. Generally, a longer time window brings a smoother trend of a calculated moving average value, which is more favorable for eliminating impact of anomalous data. The calculated moving average value may be stored in a memory (including various non-volatile memories, for example, a random access memory (RAM), a cache memory, a flash memory, etc.), and are used in a driver assistance process of controlling a vehicle. Similar to calculation of the vehicle acceleration, a distance between vehicles is processed by using a moving average algorithm.

In addition, invalid determined values, that is, a determined vehicle acceleration and a determined distance between this vehicle and a vehicle ahead, may be removed by setting a limit based on a vehicle working condition. The expressway working condition is used as an example. A limit of a vehicle acceleration may be set to −5 m/s² to +5 m/s², and a limit of a distance between vehicles may be set to 50 m to 200 m. When a vehicle acceleration and a distance between vehicles are not within the preset ranges (where for example, a vehicle acceleration is 10 m/s²), the values may be considered as invalid and thus removed. Removing an invalid value may be removing a simple average value before calculating a moving average value, or may be removing a moving average value after calculating a moving average value.

The determination step S104 further includes: associating the parameter indicating the habits of the driver with the vehicle working condition and/or the vehicle status, to obtain the habits of the driver. For example, a first distance rolling average value may be associated with the expressway and vehicle following, a second distance rolling average value may be associated with the suburban and vehicle following, and a first acceleration rolling average value may be associated with the suburban and starting. Certainly, depending on settings and requirements of the driver, the parameter indicating the habits of the driver may alternatively be associated with either of the vehicle working condition or the vehicle status.

Optionally, in step S105, depending on a current vehicle working condition and a current vehicle status, the vehicle is controlled based on the associated parameter indicating the habits of the driver. Specifically, in a subsequent driver assistance process of controlling the vehicle, a vehicle working condition and a vehicle status are first recognized, and then different acceleration rolling average values and distance rolling average values may be applied to the vehicle based on the vehicle working condition recognition result (including the expressway working condition, the suburban working condition, and the urban working condition) and the vehicle status (including the states of starting, vehicle following, and stopping), to more precisely conform to driving habits of a user in various vehicle working conditions and in various vehicle states. For example, if it is identified that a current vehicle working condition is the expressway working condition and a current vehicle status is vehicle following, the first distance rolling average value may be applied to the vehicle, to keep the distance between this vehicle and the vehicle ahead around the first distance rolling average value. For a case in which the current vehicle working condition is another vehicle working condition or the current vehicle status is another vehicle state, corresponding processing can be performed.

It should be noted that after the habits of the driver is determined for the first time, if the driver drives the vehicle again, the determination step may be stopped and only the habits determined for the first time are used to provide a driver assistance function. Alternatively, determination of the habits of the driver may be continued while a driver assistance function is provided, and in this case, information about the vehicle working condition and vehicle status recognized in steps S120 and S130 can be both used for habit determination and driver assistance. In addition, stored data on the habits of the driver may be updated by using newly determined habits of the driver while there is driver assistance, or may be updated each time driving ends.

In another embodiment, according to the method for driver assistance for determining the habits of the driver in the invention, the driver assistance function may be provided for a plurality of drivers in a targeted manner. In view of this, the method 100 further includes step S110.

In step S110, the method 100 includes: obtaining the driver identity information, where the information indicates the identity of the driver. The driver identity information may be actively entered by the driver, for example, entered into an onboard system through buttons, a touchscreen, voice, etc. The driver identity information may alternatively be automatically recognized by the vehicle, which can be performed, for example, by reading and analyzing fingerprints of a driver when the driver pulls a door handle or touches a steering wheel, or by performing facial recognition or iris recognition on the driver when the driver sits on a seat.

Correspondingly, when there are a plurality of drivers, the determination step S104 further includes: associating the parameter indicating the habits of the driver with the vehicle working condition and/or the vehicle status and/or the identity of the user. For example, a third distance rolling average value may be associated with the expressway, vehicle following, and an identity of a first driver, a fourth distance rolling average value may be associated with the suburban, vehicle following, and an identity of a second driver, and a second acceleration rolling average value may be associated with the suburban, starting, and the identity of the first driver. Certainly, depending on settings and requirements of the driver, the parameter indicating the habits of the driver may alternatively be associated with some of the vehicle working condition, the vehicle status, and the identity of the driver.

Correspondingly, when there are a plurality of drivers, in step S105, depending on a current vehicle working condition, a current vehicle status, and an identity of a current driver, the vehicle is controlled based on the associated parameter indicating the habits of the driver. Specifically, in a subsequent driver assistance process of controlling the vehicle, a vehicle working condition, a vehicle status, and an identity of a driver are first recognized, and then different acceleration rolling average values and distance rolling average values may be applied to the vehicle based on the vehicle working condition recognition result (including the expressway working condition, the suburban working condition, and the urban working condition), the vehicle status (including the states of starting, vehicle following, and stopping), and the identity of the driver, to more precisely conform to driving habits of different users in various vehicle working conditions and in various vehicle states. For example, if it is identified that a current vehicle working condition is the expressway working condition, a current vehicle status is vehicle following, and a current driver is the first driver, the third distance rolling average value may be applied to the vehicle, to keep the distance between this vehicle and the vehicle ahead around the third distance rolling average value. For a case in which the current vehicle working condition is another vehicle working condition, the current vehicle status is another vehicle state, or the current driver is another driver, corresponding processing can be performed.

Figure 2:
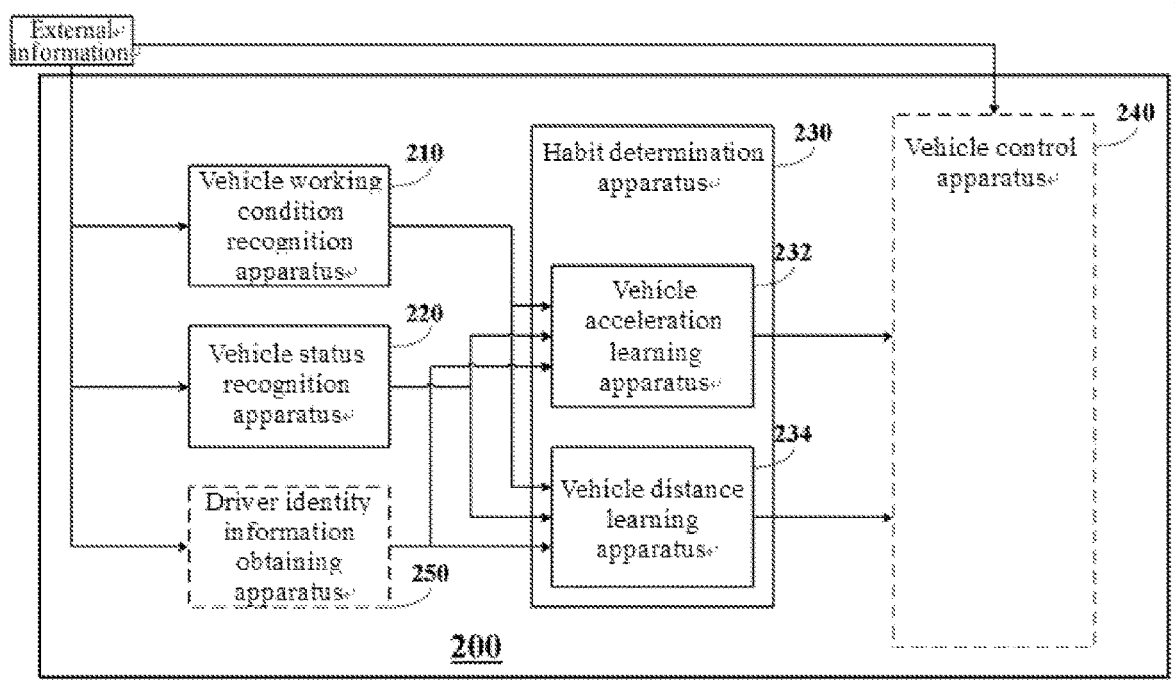
FIG. 2 is a schematic block diagram of a device 200 for driver assistance for determining habits of a driver according to an embodiment of the invention.

Now refer to FIG. 2. FIG. 2 is a schematic block diagram of a device 200 for driver assistance for determining habits of a driver according to an embodiment of the invention.

The device 200 for driver assistance for determining the habits of the driver may include: a vehicle working condition recognition apparatus 210; a vehicle status recognition apparatus 220; and a habit determination apparatus 230 configured to determine the habits of the driver based on the vehicle working condition and the vehicle status. The vehicle working condition recognition apparatus 210 is configured to: perform first vehicle working condition recognition based on vehicle speed information; and perform second vehicle working condition recognition based on a combination of map information and positioning information and/or camera information. Optionally, the device 200 may further include: a driver identity information obtaining apparatus 250 and a vehicle control apparatus 240. The following describes in detail the apparatuses in the device 200.

The vehicle working condition recognition apparatus 210 is configured to recognize the vehicle working condition. The vehicle working condition means a parameter about a type of a road on which the vehicle travels, and may include, for example, an urban working condition, a suburban working condition, and an expressway working condition. Usually, a traveling speed of the vehicle in the urban working condition is less than a traveling speed in the suburban working condition, and the traveling speed of the vehicle in the suburban working condition is less than a traveling speed in the expressway working condition. Therefore, the vehicle working condition recognition apparatus 210 may perform the first vehicle working condition recognition based on the vehicle speed information. The vehicle speed information means information quantitatively indicating a vehicle traveling speed, and may include a speed of the vehicle, an acceleration of the vehicle, an instantaneous speed of the vehicle, an average speed of the vehicle within a time period, etc. Herein, a vehicle speed obtained by an onboard speed sensor within a time period is simply used as an example for description. For example, in a process of the first vehicle working condition recognition, the vehicle working condition recognition apparatus 210 may set an urban-suburban vehicle speed threshold and a suburban-expressway vehicle speed threshold, and further recognize the vehicle working condition based on a current vehicle speed and a result of comparing the current vehicle speed with the two thresholds. For example, the urban-suburban vehicle speed threshold may be 60 km/h, and the suburban-expressway vehicle speed threshold may be 80 km/h. In this case, when the vehicle speed is less than 60 km/h, the vehicle working condition recognition apparatus 210 identifies the vehicle working condition as the urban working condition; when the vehicle speed is from 60 km/h to 80 km/h, the vehicle working condition recognition apparatus 210 identifies the vehicle working condition as the suburban working condition; and when the vehicle speed is greater than 80 km/h, the vehicle working condition recognition apparatus 210 identifies the vehicle working condition as the expressway working condition.

However, in practice, speed ranges of the vehicle traveling in urban, suburban areas and on expressways are very likely to be partly overlapping, so that there are inevitably errors in vehicle working condition recognition simply by comparing the current vehicle speed with the urban-suburban vehicle speed threshold and the suburban-expressway vehicle speed threshold. For example, when the vehicle travels on a suburban road, if a pedestrian is approaching, a vehicle speed may be occasionally lowered to below 60 km/h. However, if the road is in a good condition, the vehicle speed may be occasionally increased to above 80 km/h. Therefore, when the recognition is only based on the comparison of the current vehicle speed with the two vehicle speed thresholds, a vehicle working condition recognition result may frequently switch between the three vehicle working conditions, but actually the vehicle has been in the suburban working condition the whole time. Consequently, erroneous determination of a vehicle working condition may be caused, and there is an increase of a load on an operating system due to frequent switching.

To alleviate the foregoing problem, the vehicle working condition recognition apparatus 210 is further configured to perform the second vehicle working condition recognition based on a combination of map information and positioning information and/or camera information. The map information may mean map-based information including types of various roads (for example, the urban type, the suburban type, or the expressway type). The positioning information may mean map-based information indicating a position of the vehicle, for example, GPS information. Specifically, when the positioning information and the map information can be obtained, the vehicle working condition recognition apparatus 210 may correct the above vehicle working condition result based on the positioning information and the map information. For example, in pre-stored map information, various road types (for example, the urban type, the suburban type, or the expressway type) may be labeled in advance. In a process of recognizing the vehicle working condition, the vehicle working condition recognition apparatus 210 may recognize the vehicle working condition based on the pre-stored map information and current positioning information of the vehicle.

The vehicle working condition recognition apparatus 210 may recognize the vehicle working condition by using the camera information together with the map information and the positioning information, or by using the camera information when the map information and the positioning information cannot be obtained. For example, especially when the map information and the positioning information cannot be obtained, the vehicle working condition recognition apparatus 210 uses the camera information to perform local analysis, which can improve accuracy of vehicle working condition recognition to some degree. In an embodiment, the vehicle working condition recognition apparatus 210 may obtain a scenario of the road ahead by using an onboard camera, and determine the vehicle working condition by comparing usual urban, suburban, and expressway scenarios by means of image recognition and other technologies. For example, the vehicle working condition recognition apparatus 210 may use an expressway exit sign, a speed limit sign, an expressway fence, a median strip, etc. as features of the expressway working condition that can be recognized based on camera information; and buildings, traffic lights, pedestrians, etc. are used as features of the urban working condition that can be recognized based on camera information.

The vehicle working condition recognition apparatus 210 may use a result obtained in the second vehicle working condition recognition based on the positioning information, the map information, and/or the camera information, for further correcting a result obtained in the first vehicle working condition recognition based on the current vehicle speed and the preset thresholds, thereby improving accuracy of vehicle working condition recognition and preventing a vehicle working condition recognition result from incorrectly and frequently switching between various vehicle working conditions. This achieves efficient and accurate vehicle working condition recognition.

The vehicle status recognition apparatus 220 is configured to recognize the vehicle status. The vehicle status means a movement status of the vehicle, and may include starting, vehicle following, and stopping. Certainly, based on actual needs, the vehicle status recognition apparatus 220 may recognize other vehicle states, or may subdivide the foregoing vehicle states. For example, the state of stopping may be subdivided into stopping with the engine shut down and stopping with the engine started, and the like. The vehicle status recognition apparatus 220 may recognize the vehicle status based on one or more of vehicle speed information, vehicle feedback information, radar information, and camera information. The following describes in detail embodiments of the vehicle status recognition apparatus 220 recognizing the states of starting, vehicle following, and stopping.

In a process of the vehicle status recognition apparatus 220 recognizing the state of starting, whether the vehicle is stationary is first determined. The vehicle status recognition apparatus 220 may determine, based on a standstill signal provided by a brake system of the vehicle and a vehicle speed signal (for example, a vehicle speed signal indicating that a vehicle speed is 0), whether the vehicle is stationary. When the vehicle status recognition apparatus 220 determines that the vehicle is stationary, if an accelerator signal indicating that an accelerator pedal is stepped on is received, a current vehicle status can be identified as starting. The vehicle status recognition apparatus 220 may set a starting vehicle speed threshold, and when a vehicle speed is greater than the starting vehicle speed threshold, determine that the state of starting ends.

In a process of the vehicle status recognition apparatus 220 recognizing the state of vehicle following, the state of vehicle following may be determined based on a distance between this vehicle and a vehicle ahead and a relative speed that are calculated based on information from an onboard radar and camera, and after the state of vehicle following is determined, whether the state of vehicle following ends is then determined based on a vehicle speed of this vehicle. The radar may emit an electromagnetic wave to project on the vehicle ahead and receive a reflected wave from the vehicle ahead, such that the distance between the vehicle ahead and this vehicle, a rate of distance change (that is, a speed), an orientation, and other information are obtained. The camera information can provide an image showing the scenario in front of this vehicle, to, for example, identify whether there is a vehicle ahead. For example, the vehicle status recognition apparatus 220 may set different vehicle-following distance thresholds and relative speed thresholds for different vehicle working conditions (for example, those determined by the vehicle working condition recognition apparatus 210). In an embodiment, the vehicle status recognition apparatus 220 may set an expressway vehicle-following distance threshold to 50 m, set a suburban vehicle-following distance threshold to 30 m, and set an urban vehicle-following distance threshold to 20 m. Certainly, considering a relatively fast traveling speed in the expressway working condition, for the sake of safety, a vehicle-following distance is appropriately increased when a speed increases. Therefore, the expressway vehicle-following distance threshold may be further changed based on a current vehicle speed. Depending on a situation, vehicle-following distance thresholds in the various working conditions may be further changed based on the current vehicle speed. In another aspect, a value of a relative vehicle-following speed may be set, for example, to 0 km/h to 5 km/h. Therefore, in the case of the expressway working condition, if a distance between this vehicle and a vehicle ahead is within a range of the expressway vehicle-following distance threshold ±10 m, and a value of a relative speed of this vehicle and the vehicle ahead is 0 km/h to 5 km/h, the vehicle status recognition apparatus 220 can determine that this vehicle is in the state of vehicle following.

In a process of the vehicle status recognition apparatus 220 recognizing the state of stopping, a brake signal and vehicle speed information of this vehicle may be used. It should be noted that, "the state of stopping" herein does not mean a stationary state in recognition of the state of starting but a state existing in a process of deceleration till standstill. In an embodiment, when the brake signal indicates that a brake pedal has been stepped on for a predetermined time or a time since being stepped on within a preset time period reaches a proportion, it is determined that this vehicle enters the state of stopping. In another embodiment, the vehicle status recognition apparatus 220 may set a stopping vehicle speed threshold, and with reference to the current vehicle speed information of this vehicle, when a vehicle speed is less than the stopping vehicle speed threshold, determine that this vehicle enters the state of stopping. Certainly, the stopping vehicle speed threshold may be set dynamically. For example, the stopping vehicle speed threshold may be set based on a current vehicle speed of this vehicle. In an embodiment, after the vehicle has run with a steady vehicle speed for a period of time, the steady vehicle speed may be used as a standard, and 50% of the steady vehicle speed is used as the stopping vehicle speed threshold. Certainly, the brake signal and the vehicle speed information may alternatively be used together. For example, when a vehicle speed is less than a threshold, the brake signal is used to determine whether the vehicle starts to enter the state of stopping. Then, after the vehicle enters the stationary state, the state of stopping the vehicle ends.

In addition, if there is no vehicle ahead this vehicle (that is, non-vehicle-following state) and it is not the state of starting or stopping, the vehicle status recognition apparatus 220 determines that the vehicle is in an "invalid state" at this time. When the vehicle is in the invalid state, control (which, for example, is provided by the vehicle control apparatus 240) of the vehicle may not be changed.

The habit determination apparatus 230 is configured to determine the habits of the driver based on the vehicle working condition and the vehicle status. In an embodiment, the habits of the driver determined by the habit determination apparatus 230 include a vehicle acceleration and a distance between vehicles. Therefore, the determined habits of the driver can be more in accord with preferences of the driver in terms of riding experience, and also satisfy the driver's requirements on driving safety.

In a process of the habit determination apparatus 230 determining the habits of the driver, a moving average method, for example, may be used to obtain a parameter (for example, a vehicle acceleration and a distance between vehicles) indicating the habits of the driver, but any other applicable algorithms are not excluded. Herein, the moving average method is used as an example for description. The moving average, also referred to as a running average method, is a method of calculating, on the basis of a simple average method, a moving average value by sequentially dropping old data and adding new data with a succession, to eliminate irregular fluctuations and find out a developing trend according to which predication is carried out. A range of a plurality of consecutive simple average values for calculating a moving average value may be obtained by setting a time window (a length of which may be referred to as a moving period). In this embodiment, the simple average values may be obtained by using discrete data detected by a vehicle sensor in each interval.

For example, for a simple average value of the vehicle acceleration, it is assumed that an onboard accelerometer measures an acceleration 10 times per second, and then a simple average value of a vehicle acceleration within each second is an average value of 10 acceleration values within the second. For simple average values $a1=1$ m/s$^2$, $a2=2$ m/s$^2$, $a3=2$ m/s$^2$, $a4=2$ m/s$^2$ and $a5=5$ m/s$^2$ in 1 to 5 seconds (where t1 represents the first second, t2 represents the second second, t3 represents the third second, t4 represents the fourth second, and t5 represents the fifth second), if moving average values corresponding to t2, t3, and t4 are required (where the number of moving average values required to be calculated can alternatively be set based on needs), and a time window is set to 3 seconds, calculation is performed as follows:

Moving average value $m2=(a1+a2+a3)/3=5/3$ m/s$^2$;

Moving average value $m3=(a2+a3+a4)/3=2$ m/s$^2$; and

Moving average value $m4=(a3+a4+a5)/3=3$ m/s$^2$.

The length of the time window (that is, a moving period) may be set based on needs. Generally, a longer time window brings a smoother trend of a calculated moving average value, which is more favorable for eliminating impact of anomalous data. The calculated moving average value may be stored in a memory (including various non-volatile memories, for example, a random access memory (RAM), a cache memory, a flash memory, etc.), and are used in a driver assistance process of controlling a vehicle. Similar to calculation of the vehicle acceleration, a distance between vehicles is processed by using a moving average algorithm.

In addition, the habit determination apparatus 230 may remove, by setting a limit based on a vehicle working condition, invalid determined values, that is, a determined vehicle acceleration and a determined distance between this vehicle and a vehicle ahead. The expressway working condition is used as an example. A limit of a vehicle acceleration may be set to $-5$ m/s$^2$ to $+5$ m/s$^2$, and a limit of a distance between vehicles may be set to 50 m to 200 m. When a vehicle acceleration and a distance between vehicles are not within the preset ranges (where for example, a vehicle acceleration is 10 m/s$^2$), the values may be considered as invalid and thus removed. Removing an invalid value may be removing a simple average value before calculating a moving average value, or may be removing a moving average value after calculating a moving average value.

The habit determination apparatus 230 may be further configured to associate the parameter indicating the habits of the driver with the vehicle working condition and/or the vehicle status. For example, a first distance rolling average value may be associated with the expressway and vehicle following, a second distance rolling average value may be associated with the suburban and vehicle following, and a first acceleration rolling average value may be associated with the suburban and starting. Certainly, depending on settings and requirements of the driver, the parameter indicating the habits of the driver may alternatively be associated with either of the vehicle working condition or the vehicle status.

Optionally, the device 200 may include the vehicle control apparatus 240. The vehicle control apparatus 240 is configured to: depending on one or more of a current vehicle working condition and a current vehicle status, control a vehicle based on the associated parameter indicating the habits of the driver. Specifically, in a subsequent driver assistance process of controlling the vehicle, first, the vehicle working condition recognition apparatus 210 recognizes a vehicle working condition, and the vehicle status recognition apparatus 220 recognizes a vehicle status, and then the vehicle control apparatus 240 may apply different acceleration rolling average values and distance rolling average values to the vehicle based on the vehicle working condition recognition result (including the expressway working condition, the suburban working condition, and the urban working condition) and the vehicle status (including the states of starting, vehicle following, and stopping), to more precisely conform to driving habits of a user in various vehicle working conditions and in various vehicle states. For example, if it is identified that a current vehicle working condition is the expressway working condition and a current vehicle status is vehicle following, the vehicle control apparatus 240 may apply the first distance rolling average value to the vehicle, to keep the distance between this vehicle and the vehicle ahead around the first distance rolling average value. For a case in which the current vehicle working condition is another vehicle working condition or the current vehicle status is another vehicle state, the vehicle control apparatus 240 can perform corresponding processing.

It should be noted that after the habit determination apparatus 230 determines the habits of the driver for the first time, if the driver drives the vehicle again, the determination step may be stopped and only the habits determined for the first time are used to provide a driver assistance function. Alternatively, determination of the habits of the driver may be continued while a driver assistance function is provided by the vehicle control apparatus 240, and in this case, information about the vehicle working condition and vehicle status recognized by the vehicle working condition recognition apparatus 210 and the vehicle status recognition apparatus 220 respectively can be both used for habit determination and driver assistance. In addition, stored data on the habits of the driver may be updated by the habit determination apparatus 230 by using newly determined habits of the driver while the vehicle control apparatus 240 performs driver assistance, or may be updated by the habit determination apparatus 230 each time driving ends.

In another embodiment, according to the device 200 for driver assistance for determining the habits of the driver in the invention, the driver assistance function may be provided for a plurality of drivers in a targeted manner. In view of this, the device 200 further includes the driver identity information obtaining apparatus 250.

The driver identity information obtaining apparatus 250 is configured to obtain driver identity information, where the information indicates an identity of the driver. The driver identity information may be actively entered by the driver into the driver identity information obtaining apparatus 250, for example, entered into an onboard system through buttons, a touchscreen, voice, etc. The driver identity information may alternatively be automatically recognized by the driver identity information obtaining apparatus 250, which can be performed, for example, by reading and analyzing fingerprints of a driver when the driver pulls a door handle or touches a steering wheel, or by performing facial recognition or iris recognition on the driver when the driver sits on a seat.

Correspondingly, when there are a plurality of drivers, the habit determination apparatus 230 is further configured to associate the parameter indicating the habits of the driver with the vehicle working condition and/or the vehicle status and the identity of the user. For example, the habit determination apparatus 230 may associate a third distance rolling average value with the expressway, vehicle following, and an identity of a first driver, associate a fourth distance rolling average value with the suburban, vehicle following, and an identity of a second driver, and associate a second acceleration rolling average value with the suburban, starting, and the identity of the first driver. Certainly, depending on settings and requirements of the driver, the parameter indicating the habits of the driver may alternatively be associated with some of the vehicle working condition, the vehicle status, and the identity of the driver.

Correspondingly, when there are a plurality of drivers, the vehicle control apparatus 240 is further configured to: depending on one or more of a current vehicle working condition and a current vehicle status, and an identity of a current driver, control a vehicle based on the associated parameter indicating the habits of the driver. Specifically, in a subsequent driver assistance process of controlling the vehicle by the vehicle control apparatus 240, the vehicle working condition recognition apparatus 210, the vehicle status recognition apparatus 220, and the driver identity information obtaining apparatus 250 respectively recognize a vehicle working condition, a vehicle status, and an identity of a driver, and then the vehicle control apparatus 240 may apply different acceleration rolling average values and distance rolling average values to the vehicle based on the vehicle working condition recognition result (including the expressway working condition, the suburban working condition, and the urban working condition), the vehicle status (including the states of starting, vehicle following, and stopping), and the identity of the driver, to more precisely conform to driving habits of different users in various vehicle working conditions and in various vehicle states. For example, if it is identified that a current vehicle working condition is the expressway working condition, a current vehicle status is vehicle following, and a current driver is the first driver, the vehicle control apparatus 240 may apply the third distance rolling average value to the vehicle, to keep the distance between this vehicle and the vehicle ahead around the third distance rolling average value. For a case in which the current vehicle working condition is another vehicle working condition, the current vehicle status is another vehicle state, or the current driver is another driver, corresponding processing can be performed.

It should be noted that, various information used in the method 100 such as the vehicle speed information, the camera information, the driver identity information, the vehicle feedback information, and the radar information are collectively represented as "external information" in FIG. 2. However, based on needs, one or more of the information may be input into one or more of the vehicle working condition recognition apparatus 210, the vehicle status recognition apparatus 220, the habit determination apparatus 230, the vehicle control apparatus 240, and the driver identity information obtaining apparatus 250.

According to still another aspect of the invention, a computer-readable storage medium is provided, storing program instructions executable by a processor, and when the program instructions are executed by the processor, the method according to any embodiment of an aspect of the invention is performed.

According to yet still another aspect of the invention, a vehicle is provided, including the device according to any embodiment of an aspect of the invention.

The foregoing disclosure is not intended to limit the present disclosure to specific forms or particular application fields that are disclosed. Therefore, it is assumed that in view of the present disclosure, various alternative embodiments and/or modifications, whether clearly described or implied in this specification, of the present disclosure are possible. When the embodiments of the present disclosure are described as such, those of ordinary skill in the art would realize that without departing from the scope of the present disclosure, changes may be made in forms and details. Therefore, the present disclosure is subject only to the claims.

What is claimed:

1. A method for driver assistance for determining habits of a driver, comprising:
   recognizing a vehicle working condition, wherein the vehicle working condition indicates a parameter about a type of a road on which the vehicle travels;
   recognizing a vehicle status, wherein the vehicle status comprises starting status, vehicle following status and stopping status; and
   determining the habits of the driver based on the vehicle working condition and the vehicle status, wherein
   the recognizing a vehicle working condition comprises:
     performing a first vehicle working condition recognition based on vehicle speed information;
     performing a second vehicle working condition recognition based on a combination of map information and positioning information and/or camera information; and
     correcting a result of the first vehicle working condition recognition based on a result of the second vehicle working condition recognition,
   wherein the determining the habits of the driver based on the vehicle working condition and the vehicle status comprises:
     obtaining a parameter indicating the habits of the driver by means of a moving average method;
     associating the parameter indicating the habits of the driver with one or more of the vehicle working condition and the vehicle status; and
     depending on one or more of a current vehicle working condition and a current vehicle status, controlling a vehicle based on the associated parameter.

2. The method according to claim 1, further comprising:
   obtaining a driver identity information indicating an identity of the driver.

3. The method according to claim 2, wherein the determining the habits of the driver based on the vehicle working condition and the vehicle status further comprises:
    associating a parameter indicating the habits of the driver with one or more of the vehicle working condition and the vehicle status and the identity of the driver; and
    depending on one or more of a current vehicle working condition and a current vehicle status and current driver identity information, controlling a vehicle based on the associated parameter.

4. A device for driver assistance for determining habits of a driver, comprising:
    a vehicle working condition recognition apparatus, wherein the vehicle working condition indicates a parameter about a type of a road on which the vehicle travels;
    a vehicle status recognition apparatus, wherein the vehicle status comprises starting status, vehicle following status and stopping status; and
    a habit determination apparatus configured to determine the habits of the driver based on the vehicle working condition and the vehicle status, wherein
    the vehicle working condition recognition apparatus is configured to:
        perform a first vehicle working condition recognition based on vehicle speed information;
        perform a second vehicle working condition recognition based on a combination of map information and positioning information and/or camera information; and
        correct a result of the first vehicle working condition recognition based on a result of the second vehicle working condition recognition,
    wherein the habit determination apparatus is further configured to:
        obtain a parameter indicating the habits of the driver by means of a moving average method;
        associate the parameter indicating the habits of the driver with one or more of the vehicle working condition and the vehicle status; and
    wherein the device further comprises a vehicle control apparatus configured to:
        depending on one or more of a current vehicle working condition and a current vehicle status, control a vehicle based on the associated parameter,
    associate the parameter indicating the habits of the driver with one or more of the vehicle working condition and the vehicle status; and
    wherein the device further comprises a vehicle control apparatus configured to:
        depending on one or more of a current vehicle working condition and a current vehicle status, control a vehicle based on the associated parameter.

5. The device according to claim 4, further comprising a driver identity information obtaining apparatus configured to:
    obtain driver identity information indicating an identity of the driver.

6. The device according to claim 5, wherein the habit determination apparatus is further configured to:
    associate a parameter indicating the habits of the driver with one or more of the vehicle working condition and the vehicle status and the identity of the driver; and
    wherein the device further comprises a vehicle control apparatus configured to:
    depending on one or more of a current vehicle working condition and a current vehicle status and current driver identity information, control a vehicle based on the associated parameter.

7. A computer-readable storage medium, storing program instructions executable by a processor, wherein when the program instructions are executed by the processor, the method according to claim 1 is performed.

8. A vehicle, comprising the device according to claim 4.

* * * * *